United States Patent
Kim et al.

(10) Patent No.: US 11,976,975 B2
(45) Date of Patent: May 7, 2024

(54) HYPERSPECTRAL IMAGING SYSTEM USING NEURAL NETWORK

(71) Applicant: ELECTRONICS AND TELECOMMUNICATIONS RESEARCH INSTITUTE, Daejeon (KR)

(72) Inventors: Keo Sik Kim, Gwangju (KR); Kye Eun Kim, Jeollanam-do (KR); Jeong Eun Kim, Gwangju (KR); Hyun Seo Kang, Gwangju (KR); Hyun Jin Kim, Gwangju (KR); Gi Hyeon Min, Gwangju (KR); Si Woong Park, Gwangju (KR); Hyoung Jun Park, Gwangju (KR); Chan Il Yeo, Daejeon (KR); Young Soon Heo, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 92 days.

(21) Appl. No.: 17/571,235

(22) Filed: Jan. 7, 2022

(65) Prior Publication Data
US 2022/0221342 A1 Jul. 14, 2022

(30) Foreign Application Priority Data
Jan. 8, 2021 (KR) .................. 10-2021-0002715

(51) Int. Cl.
G06N 3/08 (2023.01)
G01J 3/28 (2006.01)

(52) U.S. Cl.
CPC .............. G01J 3/2823 (2013.01); G06N 3/08 (2013.01); *G01J 2003/2826* (2013.01)

(58) Field of Classification Search
CPC ... G01J 3/2823; G01J 2003/2826; G06N 3/08
See application file for complete search history.

(56) References Cited

U.S. PATENT DOCUMENTS 8,233,148 B2 * 7/2012 Bodkin ................ G02B 3/0056
356/328
8,744,775 B2 * 6/2014 Timmis ................ G01N 21/359
702/19

(Continued)

FOREIGN PATENT DOCUMENTS

EP 3226177 A1 * 10/2017 ............. G06K 9/033
KR 102132075 B1 7/2020

(Continued)

OTHER PUBLICATIONS

Mohammad Abdo, "Spatial scanning hyperspectral imaging combining a rotating slit with a Dove prism" 2014 (Year: 2014).*

*Primary Examiner* — Maurice C Smith
(74) *Attorney, Agent, or Firm* — Rabin & Berdo, P.C.

(57) ABSTRACT

Provided is an optical system which may acquire a hyperspectral image by acquiring a spectral image of an object to be measured, which includes, to collect spectral data and train the neural network, an image forming part forming an image from an object to be measured and transmitting collimated light, a slit moving to scan the incident image and passing and outputting a part of the formed image, and a first optical part obtaining spectral data by splitting light of the image received through the slit by wavelength. Also, the system includes, to decompose overlapped spectral data and to infer hyperspectral image data through the trained neural network, an image forming part forming an image from an object to be measured and transmitting collimated light, and a first optical part obtaining spectral data by splitting light of the received image by wavelength.

18 Claims, 12 Drawing Sheets
(9 of 12 Drawing Sheet(s) Filed in Color)

(56) References Cited

U.S. PATENT DOCUMENTS

| | | | |
|---|---|---|---|
| 9,217,670 B2 | 12/2015 | Kim et al. | |
| 9,921,106 B1 * | 3/2018 | Davis | G01J 3/1895 |
| 10,136,078 B2 * | 11/2018 | Han | G01J 3/0205 |
| 10,648,860 B2 | 5/2020 | Kang et al. | |
| 10,664,750 B2 * | 5/2020 | Greene | G06N 3/08 |
| 10,861,143 B2 * | 12/2020 | Kim | G06N 3/084 |
| 11,073,423 B2 * | 7/2021 | Tufillaro | G01J 3/0205 |
| 11,134,848 B2 | 10/2021 | Bala et al. | |
| 2021/0072081 A1 * | 3/2021 | Wang | G01J 3/2803 |
| 2021/0350590 A1 | 11/2021 | Kim et al. | |

FOREIGN PATENT DOCUMENTS

| | | |
|---|---|---|
| KR | 102146561 B1 | 8/2020 |
| KR | 102167344 B1 | 10/2020 |
| KR | 102170547 B1 | 10/2020 |
| KR | 102269229 B1 | 6/2021 |

* cited by examiner

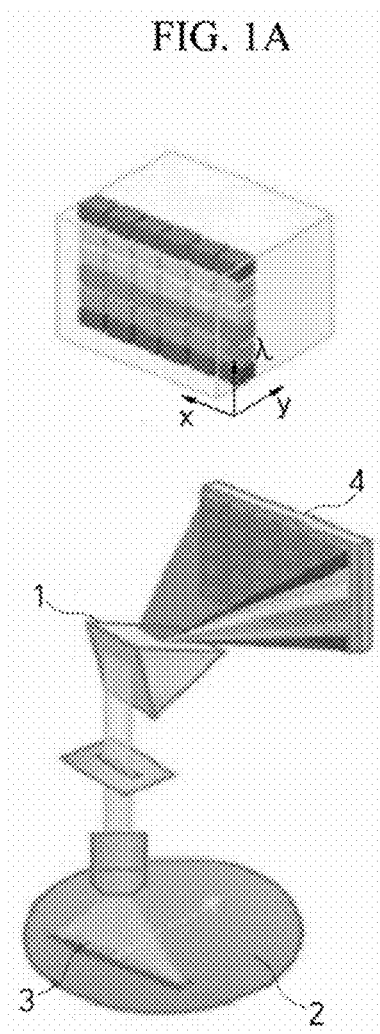

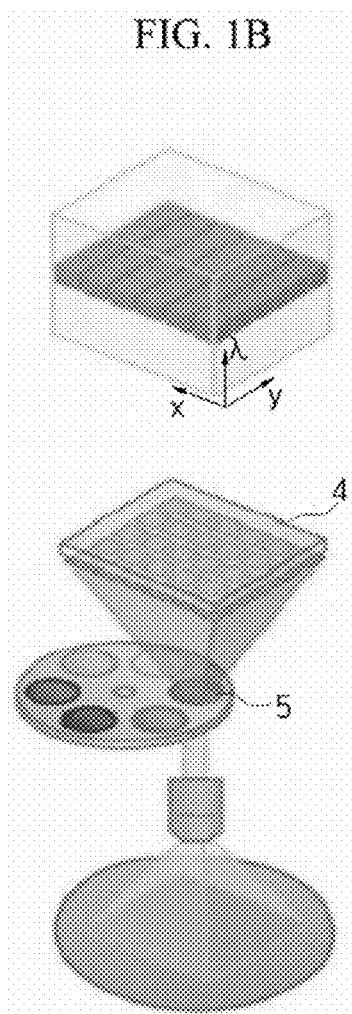

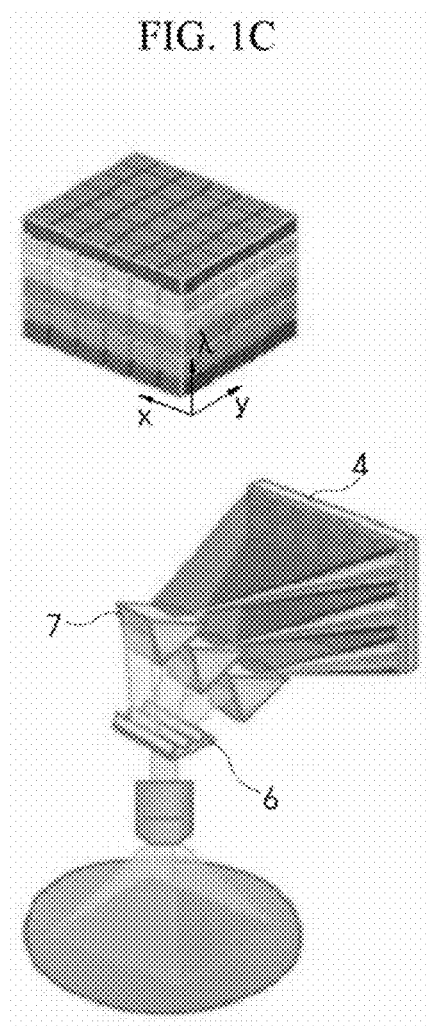

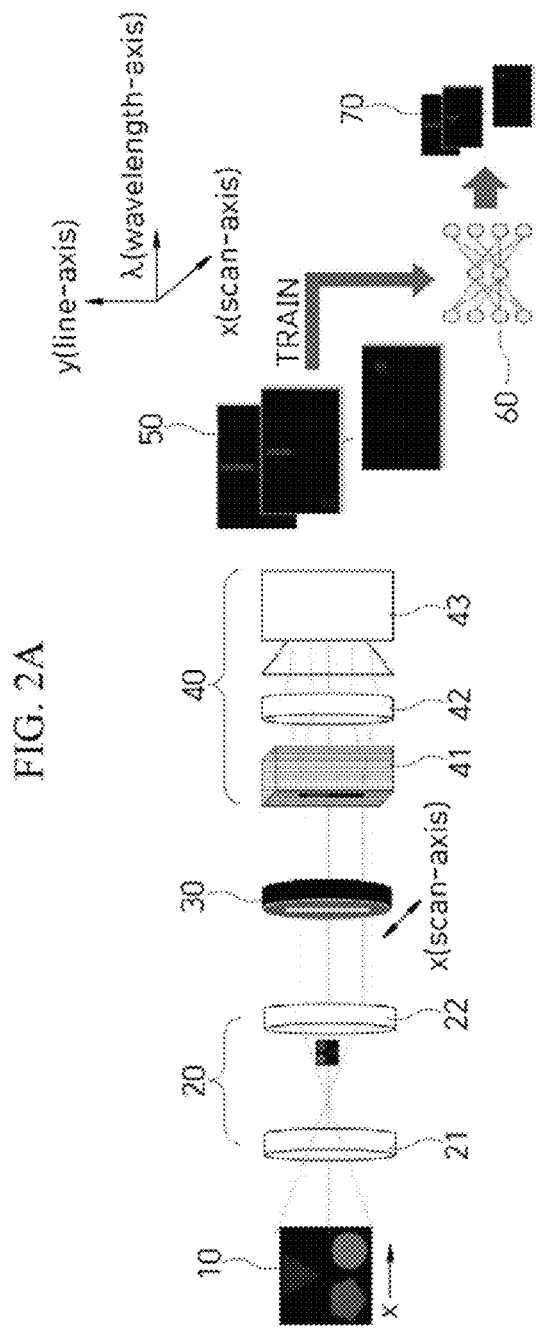

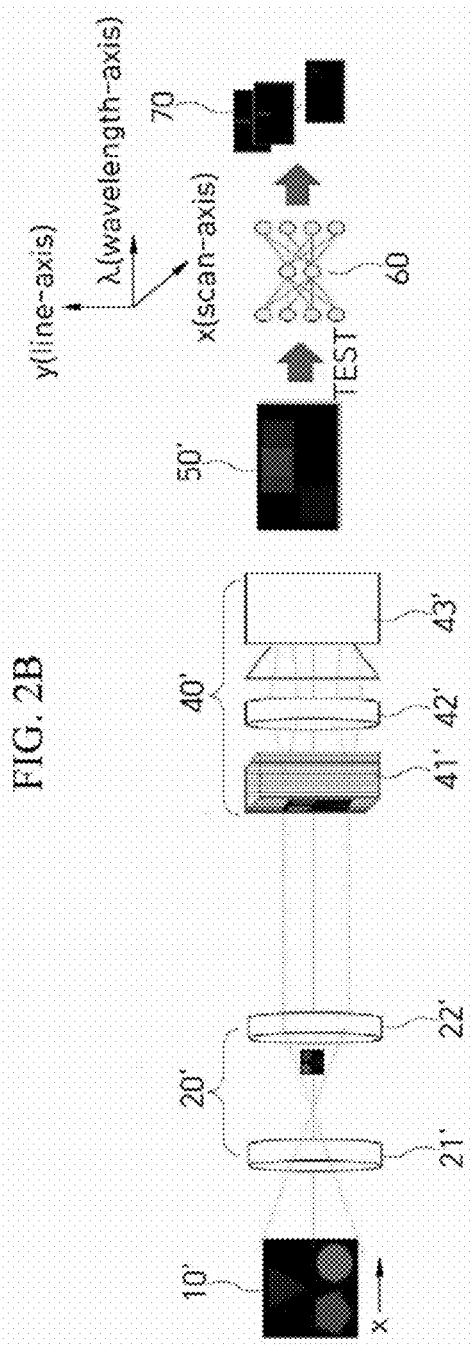

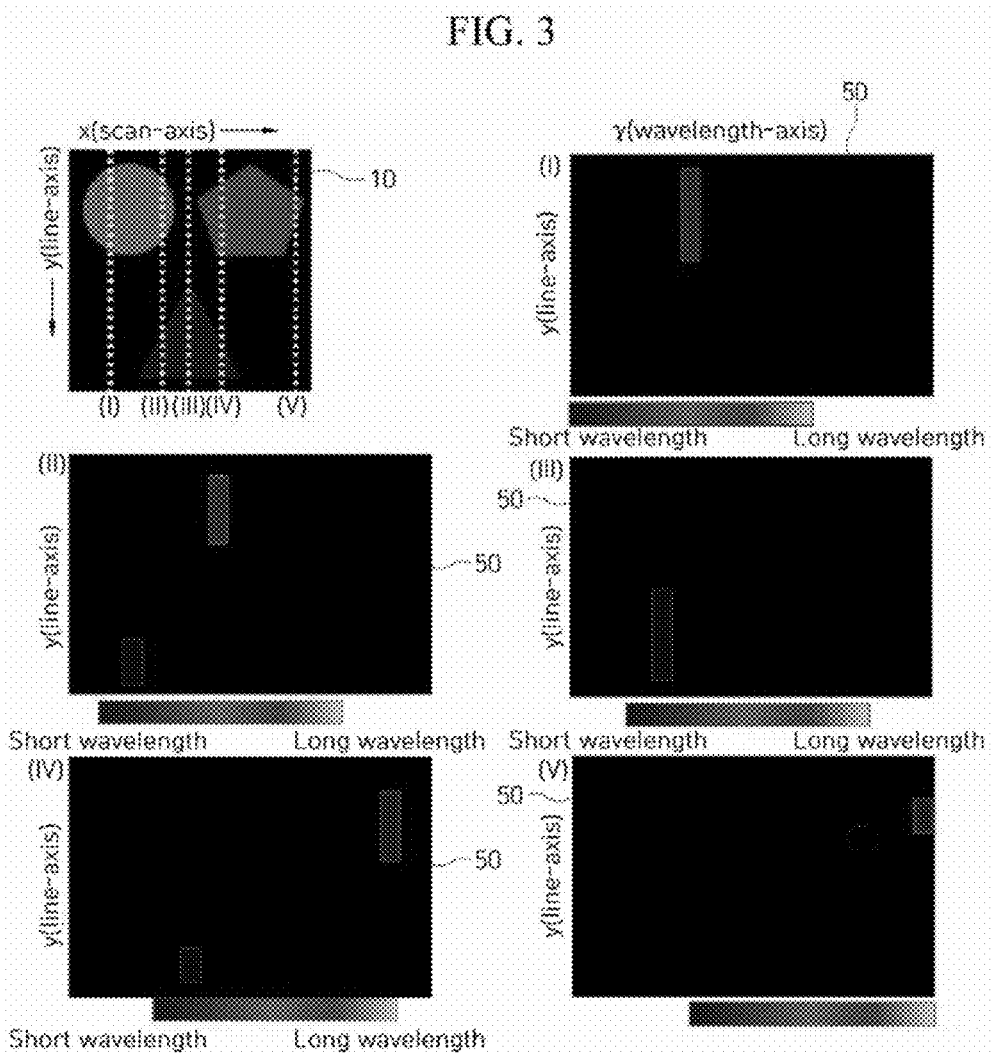

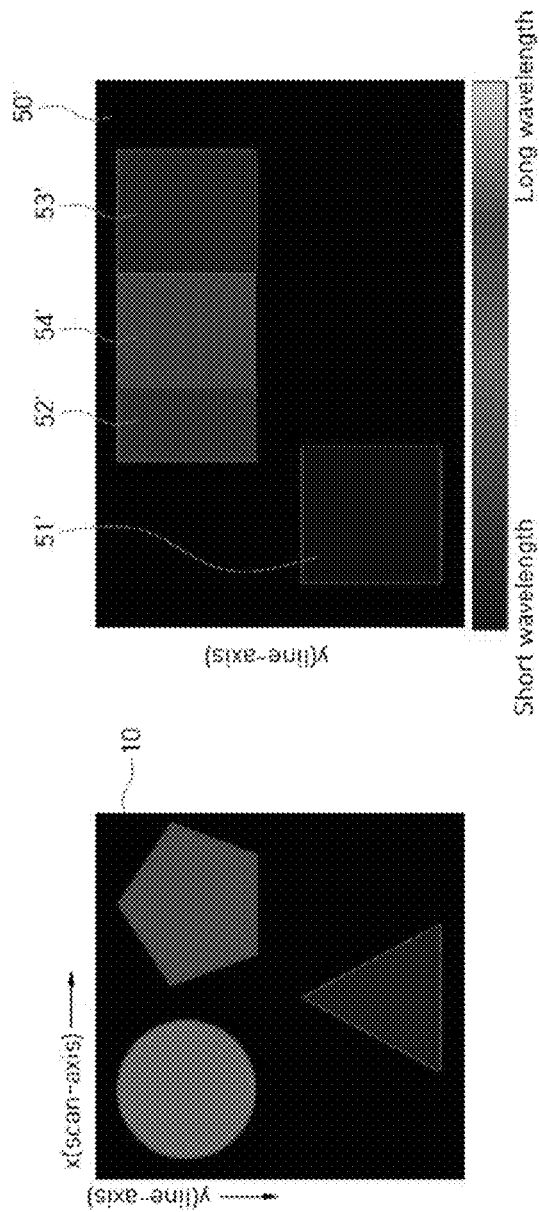

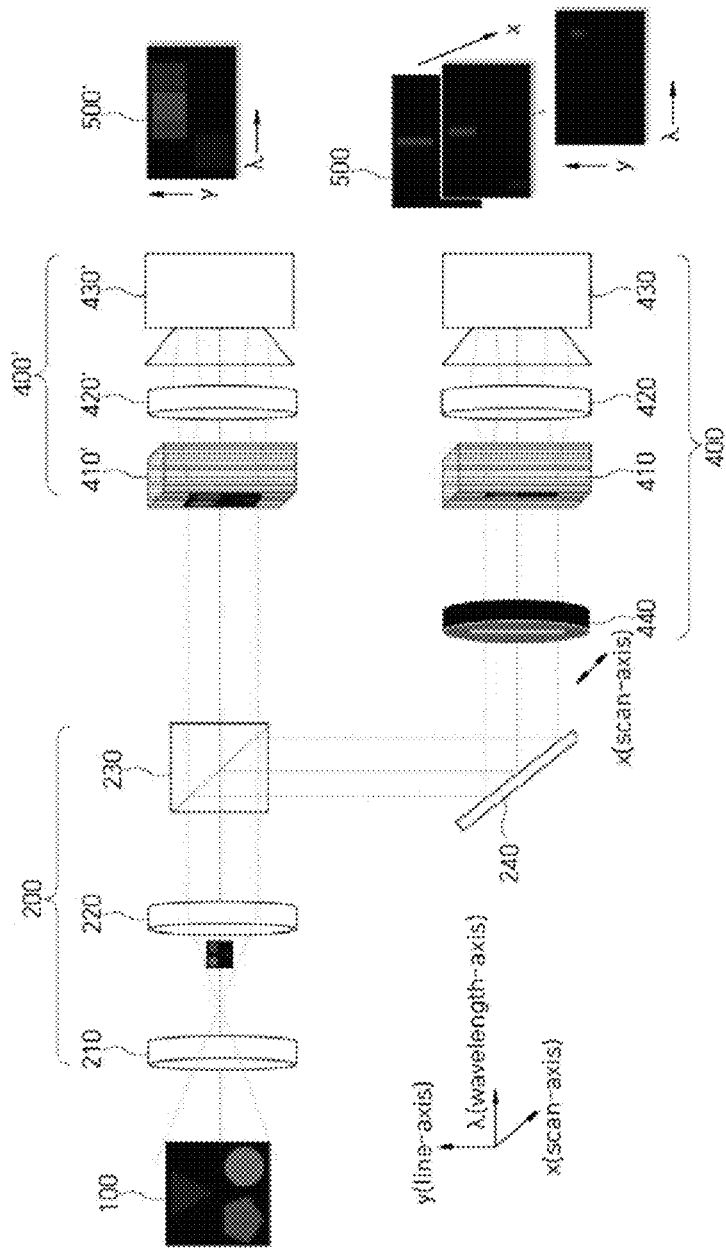

HYPERSPECTRAL IMAGING SYSTEM USING NEURAL NETWORK

CROSS-REFERENCE TO RELATED APPLICATION

This application claims priority to and the benefit of Korean Patent Application No. 10-2021-0002715 filed on Jan. 8, 2021, the disclosure of which is incorporated herein by reference in its entirety.

BACKGROUND

1. Field of the Invention

The present invention relates to a technology that may be applied to an optical system for acquiring a hyperspectral image and, more particularly, to a hyperspectral imaging optical system which may acquire a hypercube.

2. Discussion of Related Art

Hyperspectral imaging (HSI) is a technology for simultaneously acquiring spatial information and spectral information of an object to be measured and analyzing a state, properties, configuration, variation, etc. of the object to be measured to easily identify material, defect, etc., and is widely used in agriculture, geology, medicine, food science, and the like. As hyperspectral image data, a three-dimensional data cube (x, y, λ) may be obtained by combining spectral information having tens to hundreds of wavelength channels λ for every pixel constituting a two-dimensional image (x,y). Representative technologies for acquiring hyperspectral image data include spatial scanning and spectrum scanning.

A representative spatial scanning method is a line-scan method in which, as shown in FIG. 1A, an image sensor 4 detects a hyperspectral image of a desired area 3 while an optical system 1 is fixed and an object to be measured 2 is moved using a mechanical translation stage. In this way, spatial resolution and spectral resolution images with high quality may be obtained. However, image resolutions may be degraded due to a vibration effect caused by mechanical movement, and a spectral data acquisition time is limited by a scan rate.

In addition, the spectrum scanning includes a staring method, in which as shown in FIG. 1B a filter wheel 5 equipped with several wavelength filters is rotated to obtain image data through an image sensor 4, and also includes a snapshot method in which as shown in FIG. 1C an image filter 6 having a wavelength filter configured in an array form and a prism array 7 are attached to an image sensor 4 to obtain a hyperspectral image with one shot.

According to the staring method, an image may be obtained with less movement compared to the line-scan method. However, the number of measurable wavelength channels is small due to the limited number of available wavelength filters, and a hyperspectral image acquisition rate is limited due to the operational speed of the filter wheel. In addition, according to the snapshot method, hyperspectral image data can be acquired with one shot and thus high-speed hyperspectral image acquisition is possible. However, the number of measurable wavelength channels is limited due to a limitation on the number (about 16 to 25) of image filters and the spatial resolution of a hyperspectral image is reduced with an increase in the number of filters (there is a trade-off between the number of filters and the spatial resolution).

To acquire a hyperspectral image, it is necessary to consider the above-described advantages and disadvantages of various HSI methods. In general, when it is necessary to acquire a high-resolution hyperspectral image, the line-scan method is selected, and when high-speed image acquisition is necessary, the snapshot method is selected.

SUMMARY OF THE INVENTION

The present invention proposes a hyperspectral imaging (HSI) optical system for acquiring a high-resolution hyperspectral image with one shot while solving several problems (vibration noise and low speed caused by a mechanical translation scan in the line-scan method and the limited number of spectral channels and limited spatial resolution in the snapshot or staring method) mentioned in the related hyperspectral image acquisition methods, and also proposes a method of measuring hyperspectral image data using the HSI optical system.

To this end, the present invention is directed to providing an optical system for acquiring a hyperspectral image by acquiring a spectral image of an object to be measured with one shot, without spatial or spectrum scanning, using a grating and then decomposing and reconfiguring the spectral data through a pre-trained neural network.

According to an aspect of the present invention, there is provided a HSI system using a neural network for collecting spectral data and training a neural network, the HSI system including an image forming part configured to form an image from an object to be measured and to transmit collimated light, a slit configured to move to scan the incident image and to pass and output a part of the formed image, a first optical part configured to obtain spectral data by splitting light of the image received through the slit by wavelength, and a neural network configured to receive the spectral data as training data and to learn the training data.

According to another aspect of the present invention, there is provided an HSI system using a neural network for inferring hyperspectral image data by decomposing the overlapped spectral data which is captured with one shot without scanning through a trained neural network, the HSI system including an image forming part configured to form an image from an object to be measured and to transmit collimated light, a first optical part configured to obtain spectral data by splitting light of the received image by wavelength, and a neural network configured to receive the spectral data and to infer hyperspectral image data.

Configurations and operations of the present invention will become clearer through specific embodiments described with reference to the drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other objects, features and advantages of the present invention will become more apparent to those of ordinary skill in the art by describing exemplary embodiments thereof in detail with reference to the accompanying drawings, in which:

FIGS. 1A-1C illustrate conventional hyperspectral image acquisition methods;

FIGS. 2A and 2B are diagrams showing overviews of hyperspectral imaging (HSI) systems using a neural network according to an exemplary embodiment of the present invention;

FIG. 3 is a set of exemplary diagrams of scan position-specific spectral data collected through an optical part for neural network training;

FIG. 4 is a set of exemplary diagrams of channel-specific spectral data collected through an optical part when a trained neural network is applied;

FIG. 5 is a diagram showing an overview of an HSI system using a neural network according to another exemplary embodiment of the present invention;

DETAILED DESCRIPTION OF EXEMPLARY EMBODIMENTS

Figure 6:
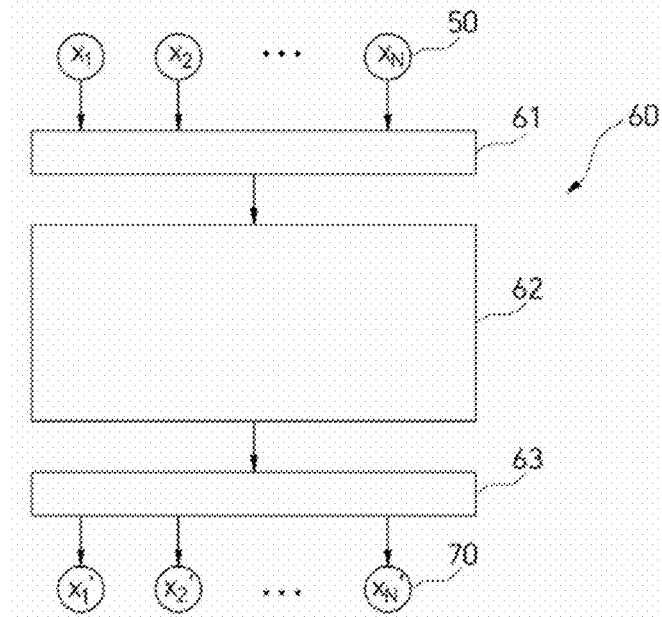
FIG. 6 is a block diagram of a neural network.

Advantages and features of the present invention and methods for accomplishing the same will become apparent from exemplary embodiments described in detail below with reference to the accompanying drawings. However, the present invention is not limited to the exemplary embodiments set forth herein but may be implemented in various different forms. The exemplary embodiments are provided only to make disclosure of the present invention thorough and to fully convey the scope of the invention to those skilled in the technical field to which the present invention pertains, and the present invention is defined by the claims. Meanwhile, terms used in this specification are for describing the exemplary embodiments rather than limiting the present invention. In this specification, singular forms include plural forms unless expressly stated otherwise. As used herein, the term "comprises" and/or "comprising" does not preclude the presence or addition of one or more components, steps, operations and/or devices other than stated components, steps, operations and/or devices. Hereinafter, the exemplary embodiments of the present invention will be described in detail with reference to the accompanying drawings. In describing the exemplary embodiments, when a detailed description of a related known configuration or function may obscure the gist of the present invention, the detailed description will be omitted.

The present invention relates to an optical system and method for acquiring a hyperspectral image with one shot using a neural network, and the detailed descriptions thereof will be described with reference to the accompanying drawings.

FIGS. 2A and 2B are conceptual diagrams of hyperspectral imaging (HSI) optical systems according to the present invention. The present invention shows a configuration (FIG. 2A) of collecting spectral data through x-axis scanning and training a neural network, and shows a configuration (FIG. 2B) of decomposing and reconfiguring overlapped spectral data, which is captured with one shot without x-axis scanning, through a neural network, which has been trained, and finally acquiring hyperspectral image data. Definitions of an x-axis, a y-axis, and a λ-axis are illustrated in FIGS. 2A and 2B. In the figures, the x-axis refers to a scan-axis, the y-axis a line-axis, and the λ-axis a wavelength-axis.

In FIG. 2A, an optical part for neural network training includes an image forming part 20 for generating (forming) an image from an object to be measured 10 and for transmitting collimated light which is uniform along both x- and y-axis, a slit 30 for passing only a part of the formed image to a next stage (first optical part 40), and a first optical part 40 for receiving the image and obtaining spectral data by splitting the light of the received image by wavelength.

The image forming part 20 includes a first lens 21 for generating (forming) an image by focusing the light scattered from the object to be measured 10 along x-axis and y-axis, and a second lens 22 for collimating the formed image to be uniformly maintained along x-axis and y-axis.

The first optical part 40 includes a first grating 41 for splitting light of the image incident thereon by wavelength, a third lens 42 for focusing the split light, and a first image sensor 43 for generating spectral data by converting the focused incident image into a digital signal. The first image sensor 43 may be a complementary metal-oxide semiconductor (CMOS) camera or a charge-coupled device (CCD) camera.

The slit 30 is used to scan the incident image in an x-axis direction and may be moved by a piezo stage, a motor, or the like.

The light scattered from the object to be measured 10 is incident (a first area) through the first lens 21, focused onto the x axis and y axis, and inverted such that an image is formed (a second area). The image is collimated through the second lens 22 and transmitted to the slit 30 (a third area). The slit 30 transmits only a part of the incident image therethrough and transmits the part of the incident image to the first grating 41 (a fourth area). The light incident on the first grating 41 is split by wavelength at each position (each point in the y-axis direction) (a fifth area). The split light is focused through the third lens 42 onto an activation area of the first image sensor 43 and incident on the first image sensor 43 (a sixth area). The first image sensor 43 generates spectral data 50 by converting the incident light into a digital signal. A spectral data train measured through FIG. 2A is used as training data for training a neural network 60.

FIG. 2B shows a configuration of a final optical part to which the trained neural network 60 is applied. The configuration is obtained by removing the slit 30 from the configuration of FIG. 2A. Light scattered from the object to be measured 10 is collimated through a first lens 21' and a second lens 22' such that a whole image is transmitted to a first grating 41' (a seventh area). The transmitted image is split by wavelength through the first grating 41' (an eighth area). The split image is focused through a third lens 42' onto an activation area of a first image sensor 43' and incident on the first image sensor 43' (a ninth area). The first image sensor 43' generates overlapped spectral data 50' by converting the incident light into a digital signal. The overlapped spectral data measured through FIG. 2B is input to the neural network 60 which has been trained, and used to finally acquire hyperspectral image data 70.

FIG. 3 is an example of the spectral data 50 acquired in each of steps corresponding to positions I to V of the slit 30 on the basis of the setup of FIG. 2A while the position of the slit 30 is scanned in the x-axis direction with respect to the object to be measured 10. The slit shown in the example has a longer width in the y-axis direction and has a smaller width in the x-axis direction through which only a part of a whole object image may be transmitted. Accordingly, an image passed through the slit corresponds to a slice of the whole image taken along the y-axis. Since such a y-axis slice image is separated into its constituent wavelengths by the first grating 41, the horizontal axis of the image data acquired by the first image sensor 43 represents a wavelength distribution (i.e., a wavelength center and a wavelength width), and the vertical axis represents y-axis image information. Only a part of a green circle is passed through the slit position I and displayed as indicated by '50' (I) in FIG. 3. A part of the green circle and a part of a blue triangle are passed through the slit position II, and the spectral information is separately displayed as indicated by 50 (II) in FIG. 3. In this case, the position of a spectral image is moved in the horizontal (a wavelength axis λ) direction on the image sensor due to the movement of the slit 30 in the x-axis direction.

FIG. 4 is an example of the spectral data 50' acquired through the first optical part 20' on the basis of the setup of FIG. 2B when the whole image of the object 10 is transmitted through the first grating 41' without the slit 30 (only wavelength regions are displayed in color without considering image shapes of spectral data). This has the same effect as overlapped spectral data (50 of FIG. 3) acquired in each of steps in FIG. 2A while the position of the slit 30 is scanned on the whole image of the object 10. Therefore, as shown in the example of FIG. 4, the blue region 51' of the spectral data 50' is generated from the blue triangle in the object to be measured 10, green spectral data (the green box) 52' is generated from the green circle, and red spectral data (the red box) 53' is generated from the red pentagon. The green spectral data and the red spectral data overlapped region 54' is generated because, as described in FIG. 3, positions at which points on the scan axis x are incident on the grating 41' vary and thus spectral data is moved in the wavelength axis (λ axis) direction.

As an exemplary embodiment different from FIG. 2, FIG. 5 shows a diagram showing a configuration of an optical system in which a first optical part 400 for training a neural network and a second optical part 400' for utilizing the trained neural network are included together and thus training and inference of a neural network 60 is simultaneously possible.

The optical system of FIG. 5 includes an image forming part 200 for forming an image from an object to be measured 100 and generating and transmitting collimated light uniform along x-axis and y-axis to the first optical part 400 and the second optical part 400' which will be described below, the first optical part 400 for obtaining spectral data by passing only a part of the formed image through x-axis scanning, and the second optical part 400' for obtaining overlapped spectral data of the formed whole image.

The image forming part 200 of FIG. 5 further includes a beam splitter 230 for splitting the light path of the image collimated by the image forming part 20 of FIG. 2A to the first optical part 400 and the second optical part 400', and a mirror 240 for reflecting and transmitting the image transmitted from the beam splitter 230 to the first optical part 400. The first optical part 400 of FIG. 5 further includes a slit 440 compared to the first optical part 40' of FIG. 2B. The second optical part 400' of FIG. 5 has the same configuration of the first optical part 40 of FIG. 2A. Light scattered from the object to be measured 100 is incident (a first area) through a first lens 210, focused onto the x-axis and y-axis, and inverted such that an image is formed (a second area). This is collimated through a second lens 220 and transmitted to the beam splitter 230 (a third area), and the beam splitter 230 splits the incident image and transmits the split images to the first optical part 400 (a fourth area) and the second optical part 400' (a ninth area). The image transmitted to the first optical part 400 passes through the mirror 240 (the fourth area) and is transmitted to the slit 440 (a fifth area) of the first optical part 400. The slit 440 transmits only a part of the incident image therethrough and transmits the part of the incident image to the first grating 410 (a sixth area). The image incident on the first grating 410 is split by wavelength (a seventh area). The split image is focused through a third lens 420 onto an activation area of a first image sensor 430 and incident on the first image sensor 430 (an eighth area). The first image sensor 430 generates spectral data 500 by converting the incident light into a digital signal. Like FIG. 2A, the spectral data 500 measured through the first optical part 400 is used as training data for training the neural network 60.

Meanwhile, the image split to the second optical part 400' through the beam splitter 230 is transmitted to the second grating 410' (the ninth area). The image incident on the second grating 410' is split by wavelength (a tenth area). The split image is incident on a second image sensor 430' through a fourth lens 420' (an eleventh area). The second image sensor 430' generates spectral data 500' by converting the incident light into a digital signal, and like FIG. 2B the spectral data 500' is input to the neural network 60 which has been trained, and is used to finally acquire hyperspectral image data.

FIG. 6 is a block diagram of a neural network 60 for acquiring hyperspectral image data according to the present invention. The neural network 60 of the present invention includes an input generation part 61 for reconfiguring training spectral data $(x\_1, x\_2, \ldots, x\_N)$ 50 measured by the first optical part 40 or 400 so that the training spectral data 50 is received by the neural network 60, a spectral data learning part 62 for training the neural network 60 with the data generated by the input generation part 61 or decomposing spectral data, and an output generation part 63 for generating decomposed spectral data $(x\_1', x\_2', \ldots, x\_N')$ 50' by reconfiguring an output of the spectral data learning part 62. Functions of each part will be described in detail below with reference to FIG. 7.

Figure 7:
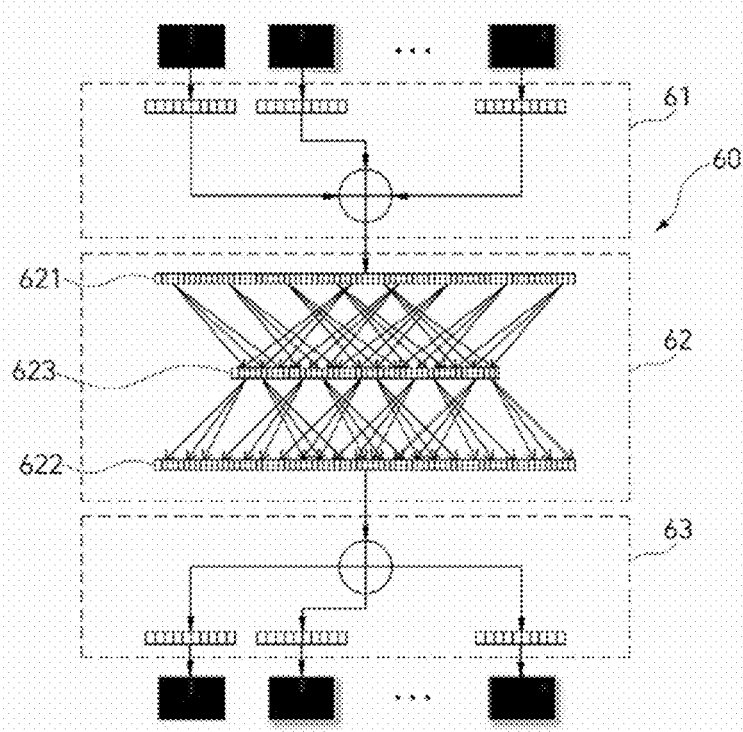
FIG. 7 is a diagram showing an internal configuration of the neural network.

FIG. 7 is a diagram showing an overall configuration of the neural network 60 for acquiring hyperspectral image data according to the present invention. The input generation part 61 reshapes dimensions of the training spectral data $x\_1, x\_2, \ldots, x\_N$ in a two-dimensional (2D) format $(y, \lambda)$ measured by the first optical part 40 or 400 into a one-dimensional (1D) format $(y \times \lambda)_n$ $(n=1, \ldots, N)$ and concatenates the reshaped data, and then transmits the concatenated training spectral data to the spectral data learning part 62. For example, in the case that the number of pieces of training spectral data is N and the 2D size of each piece of the data is $(y, \lambda)$, data transmitted from the input generation part 61 to the spectral data learning part 62 has a 1D format and a size of $(N \times y \times \lambda)$. An algorithm for generating an input value of the spectral data learning part 62 by reducing the dimension of each piece of spectral data or by extracting a feature value from the spectral data, may be added to the input generation part 61. In this case, an algorithm for restoring an image by recovering the dimension reduced by the input generation part 61 or by utilizing the feature value, may be added to the output generation part 63.

A value from the input generation part 61 is transmitted to an input layer 621 and an output layer 622 of the spectral data learning part 62. The number of nodes in the input layer 621 and the output layer 622 is $(N \times y \times \lambda)$ as described above, and the number of nodes in a hidden layer 623 is equal to a size $(y \times \lambda)$ obtained by reshaping dimensions (2D data $(y, \lambda)$)

of overlapped spectral data measured by the system of FIG. 2B (or the second optical part 400' of FIG. 5) into a 1D format. To increase the depth of the neural network 60, a layer (including nodes and weights) may be added between the input layer 621 and the hidden layer 623 and between the hidden layer 623 and the output layer 622. The output generation part 63 decomposes an output value of the spectral data learning part 62 according to the size (1D format, (y×λ)) of finally decomposed spectral data and reshapes the decomposed output value into a 2D format (y,λ), thereby estimating spectral data at each x-axis scan position.

Figure 8A:
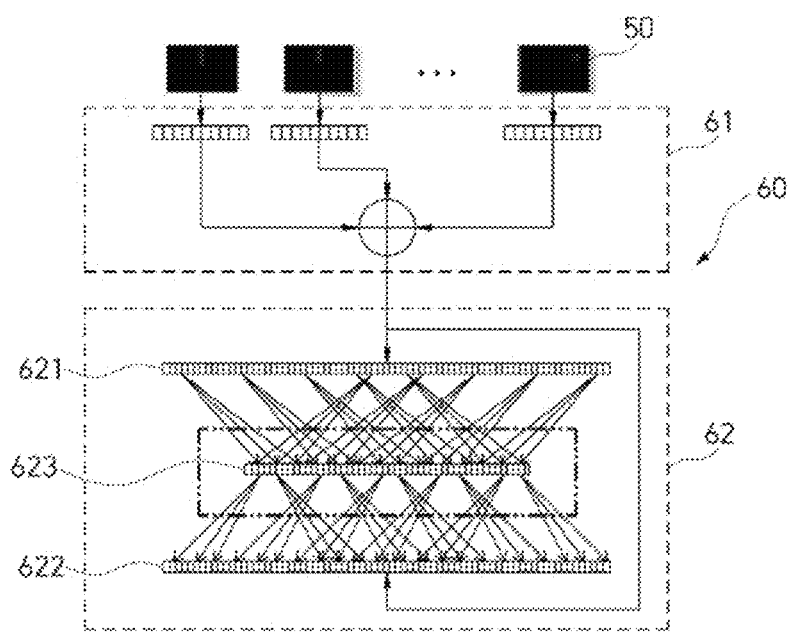
FIGS. 8A and 8B are diagrams illustrating a configuration of a neural network when hyperspectral data is learned and a method of learning hyperspectral data.
Figure 8B:
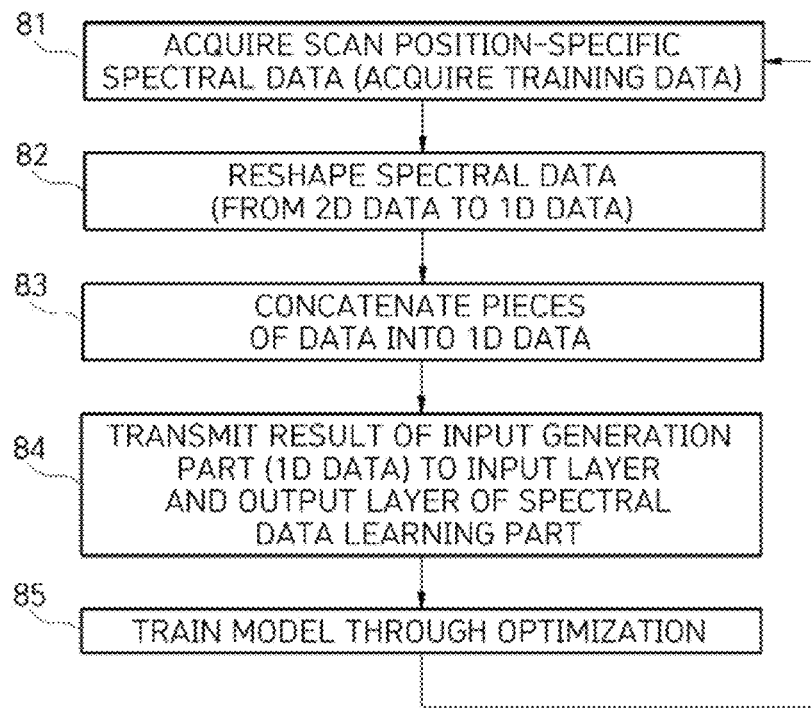

FIG. 8A shows a neural network configuration when the first optical part 400 of FIG. 2A or FIG. 5 is used for neural network training, and FIG. 8B illustrates a training method. When the first optical part 400 operates, a neural network is configured as a combination of the input generation part 61 and the spectral data learning part 62 as shown in FIG. 8A.

Referring to FIG. 8B, the training method is as follows.

81: Scan position-specific spectral data is acquired through the first optical part, such that training data is configured.

82: The collected spectral data is reshaped from a 2D format to a 1D format.

83: All the pieces of reshaped data in the 1D format are concatenated such that 1D-format data is created.

84: The data concatenated in operation 83 is transmitted to the input layer and the output layer of the spectral data learning part 62.

85: The concatenated training data is used to train a model through optimization.

Figure 9A:
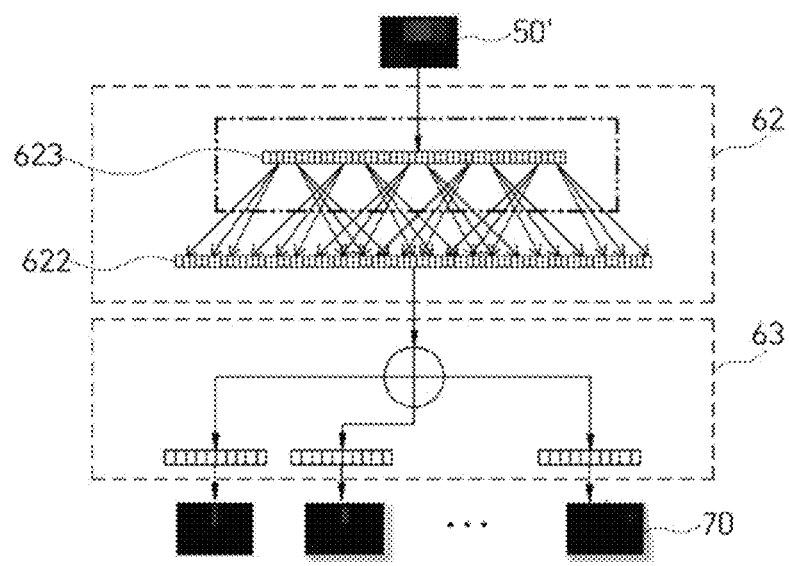
FIGS. 9A and 9B are diagrams illustrating a configuration of a neural network when hyperspectral data is inferred and a method of inferring hyperspectral data.
Figure 9B:
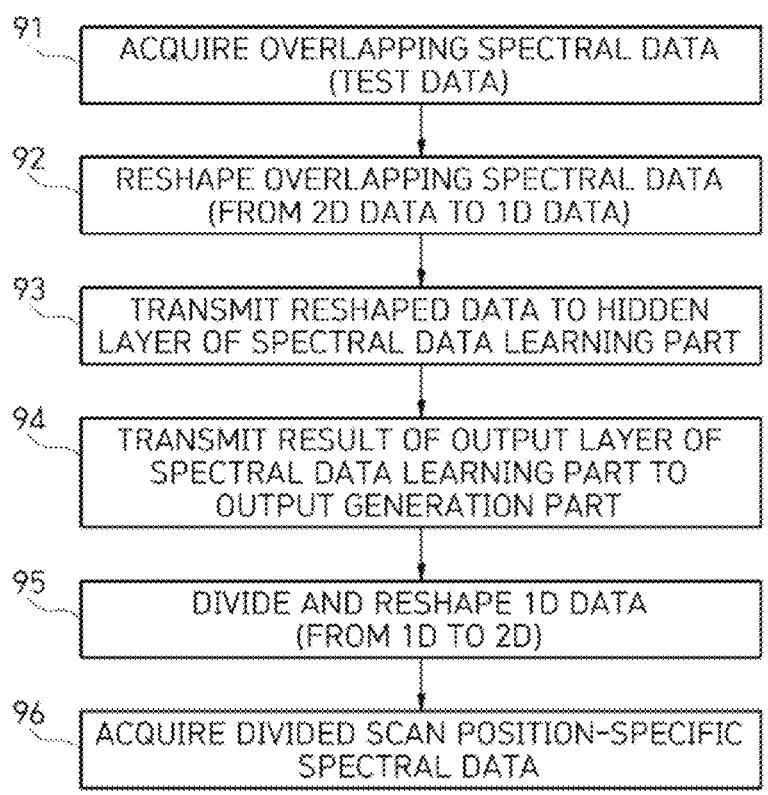

FIG. 9A shows a neural network configuration for decomposing spectral data using a neural network which is trained in advance using the system of FIG. 2B or the second optical part 400' of FIG. 5, and FIG. 9B illustrates a training method. The neural network for decomposing spectral data is configured as a combination of the spectral data learning part 62 and the output generation part 63 as shown in FIG. 9A.

Referring to FIG. 9B, the training method is as follows.

91: Overlapped spectral data is acquired through the system of FIG. 2B (or the second optical part 400' of FIG. 5).

92: The overlapped spectral data is reshaped from a 2D format to a 1D format.

93: The reshaped data is transmitted to the hidden layer 622 of the spectral data learning part 62.

94: A result data of the output layer 623 of the spectral data learning part 62 is transmitted to the output generation part 63.

95: The result data is divided according to the size of scan position-specific spectral data being finally decomposed.

96: Scan position-specific spectral data is finally acquired by reshaping the divided pieces of data into a 2D format.

According to the present invention, in the case of HSI, a hyperspectral image can be acquired with one shot without spatial scanning or spectrum scanning, such that high-speed hyperspectral image acquisition is possible. Also, since there are not mechanical moving parts, it is possible to minimize degradation of spatial or spectral resolution, and a high angular resolution hyperspectral image can be acquired.

Although the present invention has been described in detail above with reference to the exemplary embodiments thereof, those skilled in the technical field to which the present invention pertains should appreciate that the present invention may be implemented in specific forms other than those disclosed herein without changing the technical spirit or essential characteristics thereof. It should be understood that the embodiments described above are illustrative and not restrictive in all aspects. Also, the scope of the present invention is defined by the following claims rather than the above detailed description, and all alterations or modifications derived from the claims and equivalents thereof should be construed as falling into the technical scope of the present invention.

What is claimed is:

1. A hyperspectral imaging system for collecting spectral data and training a neural network, the system comprising:
   an image forming part configured to form an image from an object to be measured and to transmit collimated light;
   a slit configured to move to scan an incident image and to pass and output a part of the formed image;
   a first optical part configured to obtain spectral data by splitting light of the image received through the slit by wavelength; and
   a neural network configured to receive the spectral data as training data and to learn the training data;
   wherein the slit corresponds to a slice of the image taken along a y-axis.

2. The hyperspectral imaging system of claim 1, wherein the image forming part comprises:
   a first lens configured to form the image by focusing light scattered from the object to be measured; and
   a second lens configured to collimate the formed image.

3. The hyperspectral imaging system of claim 1, wherein the first optical part comprises:
   a first grating configured to split light of the incident image by wavelength;
   a third lens configured to focus the split light; and
   a first image sensor configured to generate the spectral data by converting a focused incident image into a digital signal.

4. The hyperspectral imaging system of claim 1, wherein the neural network comprises:
   an input generation part configured to reconfigure training spectral data ($x\_1, x\_2, \ldots, x\_N$) measured by the first optical part so that the training spectral data is received by the neural network;
   a spectral data learning part configured to train the neural network with data generated by the input generation part; and
   an output generation part configured to generate decomposed spectral data ($x\_1', x\_2', \ldots, x\_N'$) by reconfiguring an output of the spectral data learning part.

5. The hyperspectral imaging system of claim 4, wherein the input generation part is configured to reshape dimensions of the training spectral data ($x\_1, x\_2, \ldots, x\_N$) in a two-dimensional (2D) format measured by the first optical part into a one-dimensional (1D) format, concatenate the training spectral data, and then transmit the concatenated training spectral data to the spectral data learning part.

6. A hyperspectral imaging system for inferring hyperspectral image data by decomposing overlapped spectral data through a trained neural network, the system comprising:
   an image forming part configured to form an image from an object to be measured and to transmit collimated light;
   a first optical part configured to obtain spectral data by splitting light of a received image by wavelength; and
   a neural network configured to receive the spectral data and to infer hyperspectral image data;
   wherein the neural network comprises:

an input generation part configured to reconfigure training spectral data (x_1, x_2, ..., x_N) measured by the first optical part so that the training spectral data is received by the neural network; and a spectral data learning part configured to decompose the spectral data using the data generated by the input generation part; and wherein the spectral data learning part includes an input layer and an output layer having a number of nodes corresponding to the reconfigured spectral training data, and a hidden layer between the input layer and the output layer, the hidden layer corresponding to a reshaped dimension of the training spectral data.

7. The hyperspectral imaging system of claim 6, wherein the image forming part comprises:

a first lens configured to form the image by focusing light scattered from the object to be measured; and a second lens configured to collimate the formed image.

8. The hyperspectral imaging system of claim 6, wherein the first optical part comprises:

a first grating configured to split the light of an incident image by wavelength;

a third lens configured to focus the split light; and a first image sensor configured to generate the spectral data by converting a focused incident image into a digital signal.

9. The hyperspectral imaging system of claim 6, wherein the neural network further comprises:

an output generation part configured to generate decomposed spectral data (x_1', x_2', ..., x_N') by reconfiguring an output of the spectral data learning part.

10. The hyperspectral imaging system of claim 9, wherein the output generation part is configured to estimate spectral data at each scan position by decomposing an output value of the spectral data learning part according to a size of finally decomposed spectral data in a one-dimensional (1D) format and reshaping the decomposed output value into a two-dimensional (2D) format.

11. The hyperspectral imaging system of claim 6, wherein the spectral data learning part further includes a layer including nodes and weights between the input layer and the hidden layer, and a layer including nodes and weights between the hidden layer and the output layer.

12. A hyperspectral imaging system for training a neural network by collecting spectral data and inferring hyperspectral image data by decomposing overlapped spectral data through the trained neural network, the system comprising:

an image forming part configured to form an image from an object to be measured and to transmit collimated light;

a first optical part configured to obtain spectral data by scanning the formed image and passing a part of the formed image;

a second optical part configured to obtain overlapped spectral data of a whole formed image; and a neural network configured to receive and learn the spectral data obtained by the first optical part as training data and to infer the hyperspectral image data by receiving the overlapped spectral data obtained by the second optical part.

13. The hyperspectral imaging system of claim 12, wherein the image forming part comprises:

a first lens configured to form the image by focusing light scattered from the object to be measured;

a second lens configured to collimate the formed image; and a beam splitter configured to split a light path of the collimated image to the first optical part and the second optical part and transmit the image to the first optical part and the second optical part.

14. The hyperspectral imaging system of claim 13, wherein the image forming part further comprises a mirror configured to reflect the image before the image is transmitted from the beam splitter to the first optical part.

15. The hyperspectral imaging system of claim 12, wherein the first optical part comprises:

a slit configured to move to scan an incident image and to pass and output a part of the formed image;

a first grating configured to split light of the image received through the slit by wavelength;

a third lens configured to focus the split light; and a first image sensor configured to generate the spectral data by converting the focused incident image into a digital signal.

16. The hyperspectral imaging system of claim 12, wherein the second optical part comprises:

a first grating configured to split light of an incident image by wavelength;

a third lens configured to focus the split light; and a first image sensor configured to generate the overlapped spectral data by converting a focused incident image into a digital signal.

17. The hyperspectral imaging system of claim 12, wherein the neural network comprises:

an input generation part configured to reconfigure training spectral data (x_1, x_2, ..., x_N) measured by the first optical part so that the training spectral data is received by the neural network;

a spectral data learning part configured to train the neural network with data generated by the input generation part and make an inference by decomposing the spectral data; and an output generation part configured to generate decomposed spectral data (x_1', x_2', ..., x_N') by reconfiguring an output of the spectral data learning part.

18. The hyperspectral imaging system of claim 17, wherein the input generation part is configured to reshape dimensions of the training spectral data (x_1, x_2, ..., x_N) in a two-dimensional (2D) format measured by the first optical part into a one-dimensional (1D) format, concatenate a result reshaped, and then transmit the concatenated training spectral data to the spectral data learning part, and wherein the output generation part is configured to estimate spectral data at each scan position by decomposing an output value of the spectral data learning part according to a size of spectral data in the 1D format being finally decomposed and by reshaping the decomposed output value into the 2D format.

* * * * *